United States Patent [19]

Pan et al.

[11] Patent Number: 5,588,850

[45] Date of Patent: Dec. 31, 1996

[54] GROUNDING MEANS FOR MEMORY CARD CONNECTOR

[75] Inventors: H. T. Pan; Chu-Mei Chen, both of Taipei Hsien, Taiwan

[73] Assignee: Tongrand Limited, Queensway, Hong Kong

[21] Appl. No.: 512,335

[22] Filed: Aug. 8, 1995

[51] Int. Cl.⁶ .................................................. H01R 13/62
[52] U.S. Cl. .............................................. 439/92; 439/74
[58] Field of Search .............................. 439/92, 157, 159, 439/153, 155, 95, 108, 74, 377

[56] References Cited

U.S. PATENT DOCUMENTS

| | | | |
|---|---|---|---|
| 5,286,207 | 2/1994 | McHugh | 439/159 |
| 5,299,946 | 4/1994 | Kusakabe | 439/159 |
| 5,451,168 | 9/1995 | Shuey | 439/157 |
| 5,469,332 | 11/1995 | Alvite | 439/60 |

*Primary Examiner*—Gary F. Paumen
*Assistant Examiner*—T. C. Patel
*Attorney, Agent, or Firm*—Cushman, Darby & Cushman, L.L.P.

[57] ABSTRACT

A grounding strip for a memory card connector is disclosed to provide the electrical grounding of the memory card inserted. The memory card connector comprises a guide frame having a pair of guiding slots. Each of the guiding slots has formed therein a pair of notches and a receiving slot. The grounding strip comprises a substantially elongated body. A curved contact portion is formed approximate one end of the elongated body that arises generally above the surface of the elongated body. An end portion is formed at the remote end beyond the contact portion of the elongated body. A first pair of bent portions are respectively located at the opposing sides of the elongated body and extending away from the surface of the elongated body, and each of the first bent portions has formed thereon a latching means. When the grounding strip is assembled to the designated location on the guide frame of the memory card connector, the end portion would be received in the receiving slot of the guiding slot. Each of the first pair of bent portions would be inserted into a corresponding one of the first pair of notches, and the latching means of the first pair of bent portions would latch with the corresponding configuration inside the corresponding notch. Firm attachment of the grounding strip to the guide frame of the memory card connector can therefore be secured.

9 Claims, 8 Drawing Sheets

GROUNDING MEANS FOR MEMORY CARD CONNECTOR

BACKGROUND OF THE INVENTION

1. Field of the Invention

The present invention relates in general to a memory card connector. In particular, the present invention relates to the grounding means for a memory card connector. More particularly, the present invention relates to the grounding means for a memory card connector that is easily attached but secure from departing.

2. Technical Background

Semiconductor integrated circuit memory cards, in particular, a number of IC peripheral cards for portable computers are widely adopted in microprocessor-based computer systems as the means of peripheral device expansion. One of such memory cards is the PCMCIA card as proposed by the Personal Computer Memory Card International Association. This association is a computer industry group that defined the PCMCIA standard for small electronic cards and the way these cards communicate with the host computer.

Although, as the name implies, the PCMCIA cards were intended primarily for the memory expansion of the portable computer systems that require reduced overall system size, however, the PCMCIA standard has now evolved from its very first edition, Type I, through Type II, and now Type III within a relatively short period of time. The PCMCIA standard has been adopted by peripheral devices other than the memory expansion adapter cards. They include, for example, PCMCIA network cards, SCSI cards, facsimile/modem cards, even the sound cards and hard disk drive cards. It should therefore be noted that although the present invention utilizes the term "memory card connector", however, it should be understood that the card connector of the present invention is not limited to the category of memory cards only, other categories of peripheral functional cards are also applicable in the use of the memory card of the present invention.

With the wide acceptance of the PCMCIA cards for the microprocessor-based computer systems, in particular in the category of notebook computers, those computer systems providing the compatibility to the PCMCIA cards would have to be equipped with at least one PCMCIA slot. The memory card slot is basically an electrical signal connector that provides for the electrical connection between the electronic circuitry as contained in the PCMCIA card and the host system logic circuitry.

FIG. 1 of the accompanying drawing of the present invention depicts a perspective view of a conventional memory card connector with the components thereof shown in exploded manner. A description of the prior art memory cards connector serves to assist in the description of the present invention.

As is seen in FIG. 1, a conventional memory card connector 1, which is suitable for receiving the insertion of a memory card not shown in the drawing. The memory card connector 1 is shown to generally comprise a guide frame 10, a pair of grounding strips 16, a top cover plate 20, a connector head 30, a rocker lever 40, a push-out plate 50, and a push rod 60.

The guide frame 10 has a pair of guiding slots 12 formed along both sides of the memory card connector 1 that extend along the direction of the insertion and removal of the memory card in and out of the memory card connector 1.

The guiding slots 12 are utilized to receive the edges of the memory card when inserted. The guide frame 10 has attached thereto a pair of grounding strips 16, with each of them attached to one side of the guide frame 10 that provide for the electrical contact with the edge of the memory card that has been inserted therein. This allows for the establishment of the grounding path that is necessary when the memory card is inserted into the connector and becomes a portion of the electronic circuitry of the entire system.

The conventional memory card connector 1 as shown in FIG. 1 employs a simple method to provide for the attachment of the grounding strips 16 thereto. Each of the grounding strips 16 has a bent portion 162, which is received in a correspondingly provided receiving slot 18 on the side of the guide frame 10. This allows for the grounding strips 16 to be fixed in the guiding slots 12 of the guide frame 10, thereby establishing the required electrical grounding path.

However, the attachment of the grounding strips 16 to the guide frame 10 is simply provided by the insertion of the bent portion 162 of the grounding strips 16 in the receiving slot 18. This is obviously an insecure way of attachment, and fall off of the grounding strips 16 may easily become a fact, especially when the memory card is inserted or removed from the slot.

SUMMARY OF THE INVENTION

It is therefore an object of the present invention to provide a grounding strip for the memory card connector for providing the establishment of the electrical grounding path that is secure from detaching.

It is another object of the present invention to provide a grounding strip for the memory card connector for providing the establishment of the electrical grounding path that is easy to make and attach.

The present invention achieves the above-identified objects by providing a grounding strip for a memory card connector to provide the electrical grounding of the memory card inserted. The memory card connector comprises a guide frame having a pair of guiding slots. Each of the guiding slots has formed therein a pair of notches and a receiving slot. The grounding strip comprises a substantially elongated body. A curved contact portion is formed at one end of the elongated body that arises generally above the surface of the elongated body. An end portion is formed at the remote end beyond the contact portion of the elongated body. Each of a first pair of bent portions is located at the opposing side of the elongated body and extending away from the surface of the elongated body, and each of the first bent portions has formed thereon a latching means. When the grounding strip is assembled to the designated location on the guide frame of the memory card connector, the end portion would be received in the receiving slot of the guiding slot. Each of the first pair of bent portions would be inserted into a corresponding one of the first pair of notches, and the latching means of the first pair of bent portions would latch with the corresponding configuration inside the corresponding notch. Firm attachment of the grounding strip to the guide frame of the memory card connector can therefore be secured.

BRIEF DESCRIPTION OF THE DRAWING

Other objects, features, and advantages of the present invention will become apparent by way of the following detailed description of the preferred but non-limiting embodiments. The description is made with reference to the accompanied drawings in which.

DETAILED DESCRIPTION OF THE PREFERRED EMBODIMENT

Figure 1:
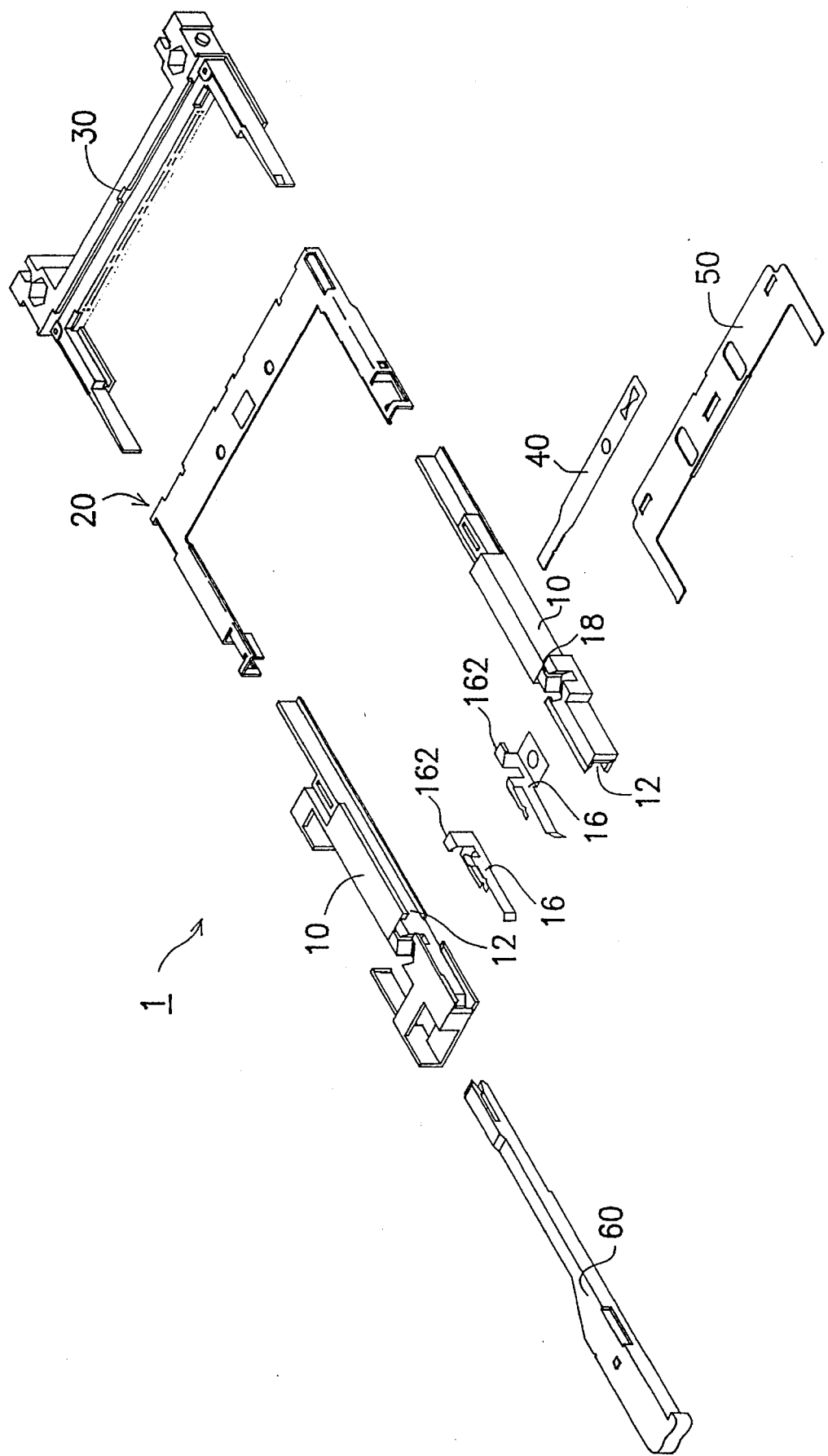
FIG. 1 is a perspective view of the conventional memory card connector with the components thereof shown in exploded manner.
Figure 2:
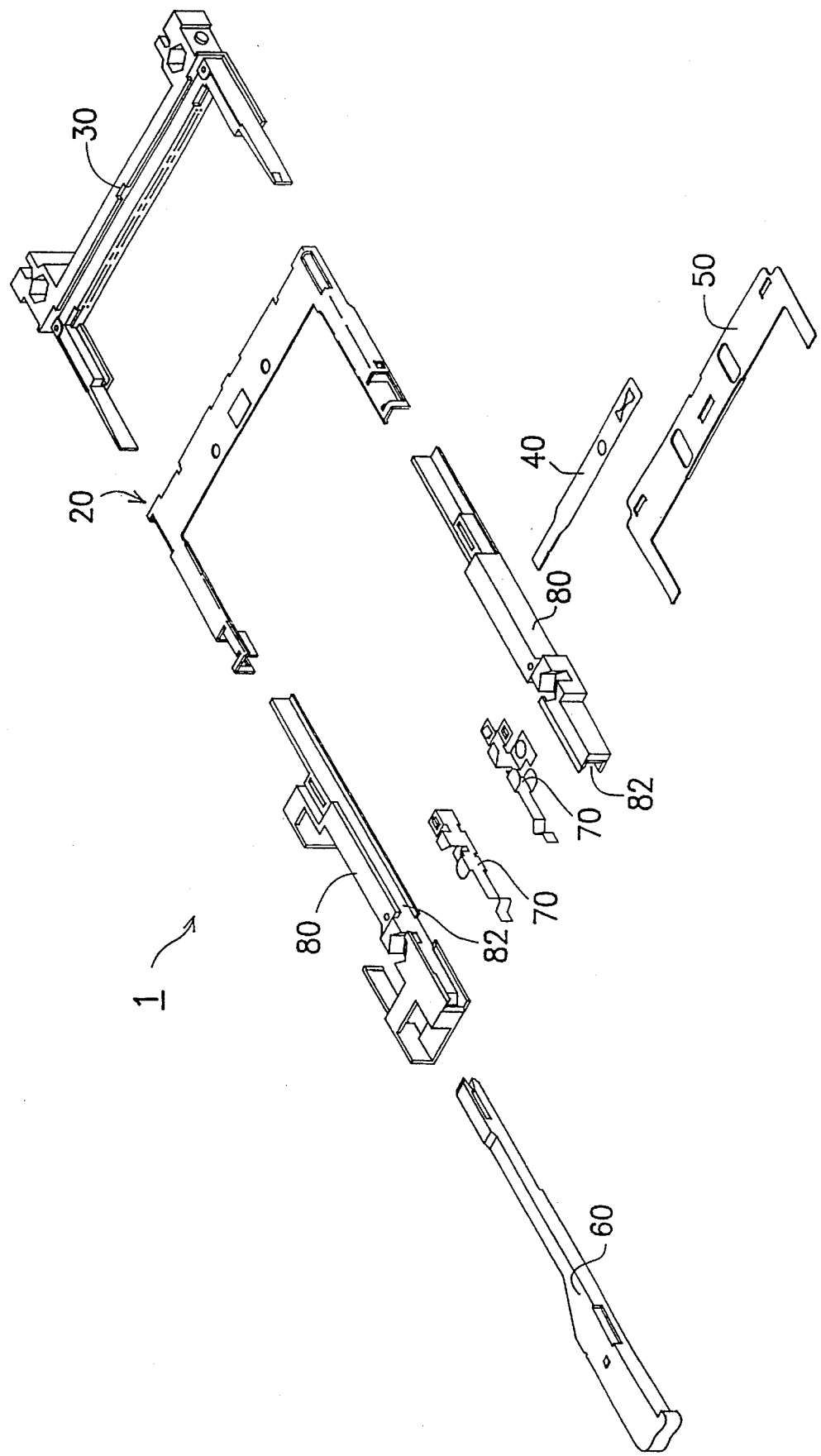
FIG. 2 is a perspective view of the memory card connector having a pair of grounding strips in accordance with a preferred embodiment of the present invention with the components thereof shown in exploded manner.

Refer to FIG. 2 of the drawing. FIG. 2 is a perspective view of the memory card connector 1 having a grounding strips 70 in accordance with a preferred embodiment of the present invention. In the drawing, the components of the memory card connector are shown in the exploded manner. As is seen in the drawing, the components similar in function as that of the conventional memory card connector of FIG. 1 bear the same reference numeral. The memory card connector 1 comprises a guide frame 80, a pair of grounding strips 70, a top cover plate 20, a connector head 30, a rocker lever 40, a push-out plate 50, and a push rod 60.

The guide frame 80 is provided with a pair of guiding slots 82 along both sides of the memory card connector 1 that extend along the direction of the insertion and removal of the memory card in and out of the memory card connector 1. As described above, the guiding slots 82 are used to receive the edges of the memory card when inserted. The guide frame 80 has attached thereto a pair of grounding strips 70, with each of them attached to one side of the guide frame 80 that provide for the electrical contact with the edge of the memory card that has been inserted therein. This establishes the grounding path that is necessary when the memory card is inserted into the connector and becomes a portion of the electronic circuitry of the entire system.

Figure 3:
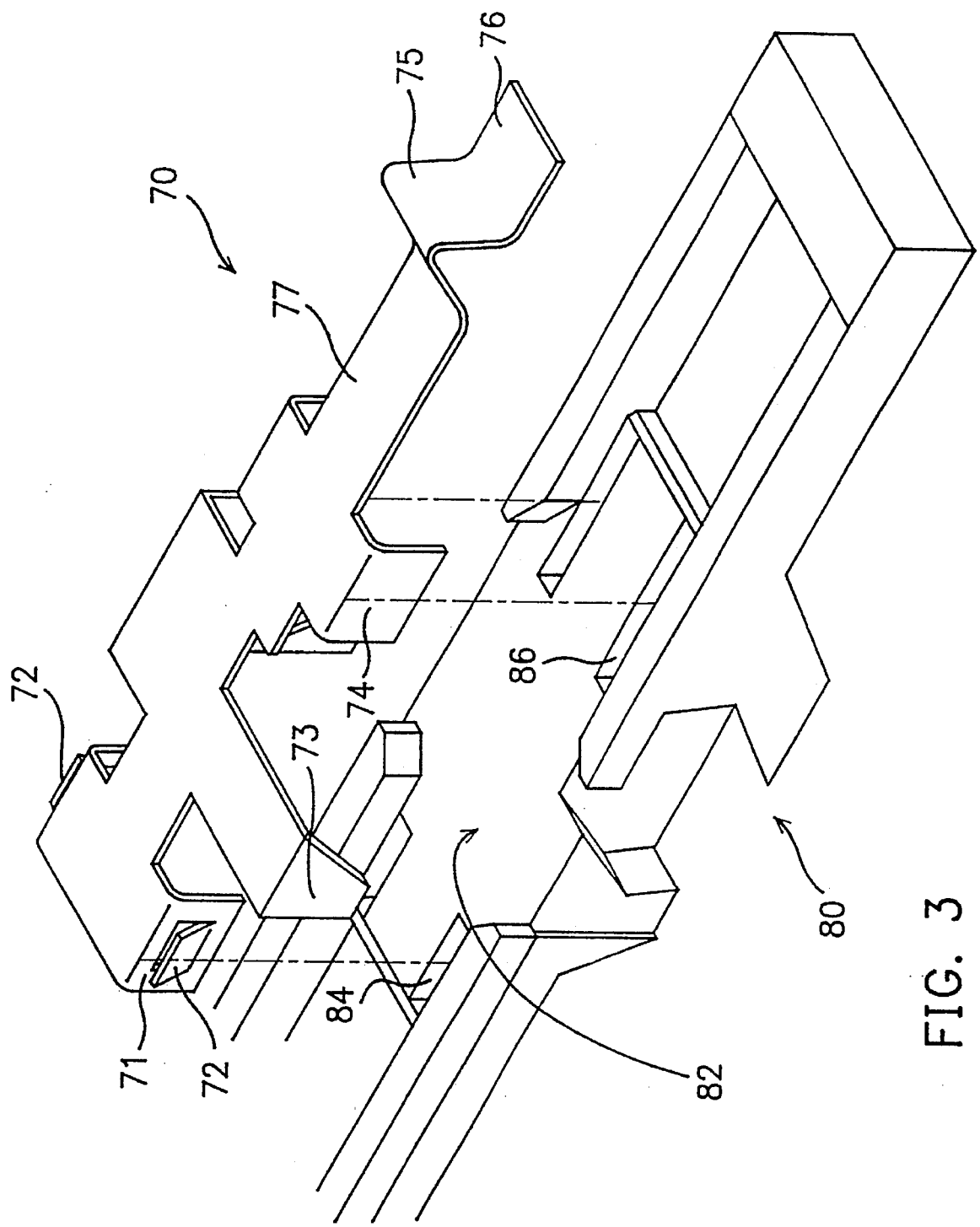
FIG. 3 is a perspective view of the grounding strip of the memory card connector of FIG. 2 and the corresponding guide frame.

Refer next to FIG. 3. FIG. 3 is an enlarged perspective view of the grounding strip 70 of the memory card connector 1 of FIG. 2 and the corresponding guide frame 80. The grounding strip 70 comprises basically of an elongated body 77, with a contact portion 75 formed by bending the remote end of the elongated body 77, as is seen in the drawing. An end portion 76 further extends beyond the contact portion 75 at the remotest end of the elongated body 77 of the grounding strip 70. Along both edges of the grounding strip 70 that extend along the longitudinal axis thereof, there are provided with a first pair of bent portions 71, a second pair of bent portions 73, and a third pair of bent portions 74. On the surface of each of the first pair of bent portions 71, there is further provided with a resilient plate 72.

Figure 4:
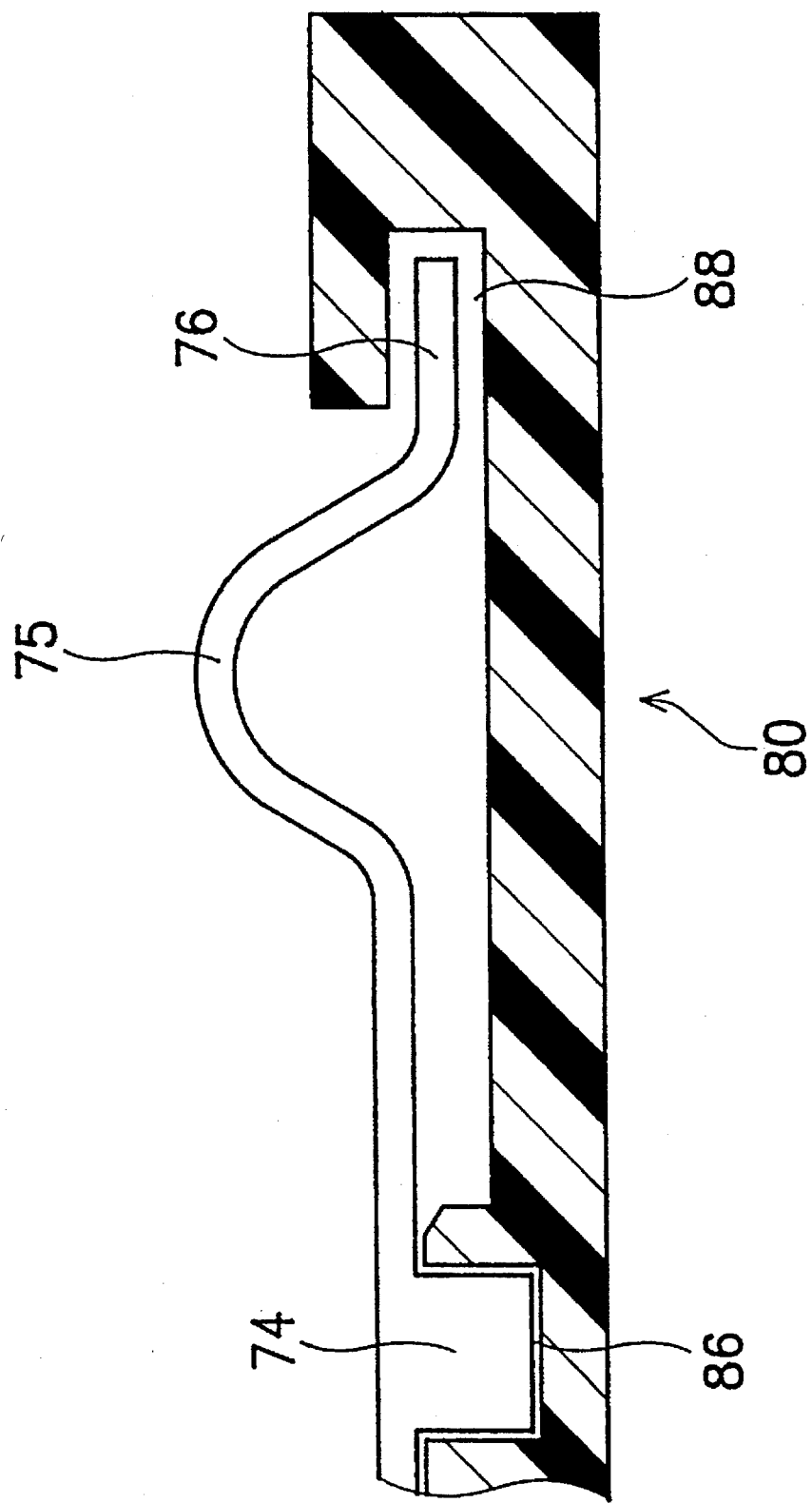
FIG. 4 shows the cross-sectional view of the grounding strip and the guide frame of FIG. 3.

On the other hand, inside each of the guiding slots 82 of the guide frame 80, there are provided with a first pair of notches 84, a second pair of notches 86, and a receiving slot 88 (FIG. 4). When the grounding strip 70 is assembled into the mating position with the guide frame 82 of the connector 1, each of the first and third pairs of the bent portions 71 and 74 respectively are then inserted into corresponding first and second pair of notches 84 and 86 respectively, while each of the second pair of bent portions 73 rests respectively on the side of the guide frame 80. The remote end portion 76 of the elongated body 77 of the grounding strip 70 is protectively received in the receiving slot 88, as can be seen in the drawing of FIG. 4.

When the grounding strip 70 mates securely with the guide frame 80, each of the resilient plates 72 punched out of the surface of the corresponding first bent portions 72 provides the tight clamping of the elongated body 77 of the grounding strip 70 into the corresponding one of the first pair of notches 84. This allows for the tight mating of the grounding strip 70 to the guide frame 80, thereby preventing the accidental disassembly of the two components.

Figure 5C:
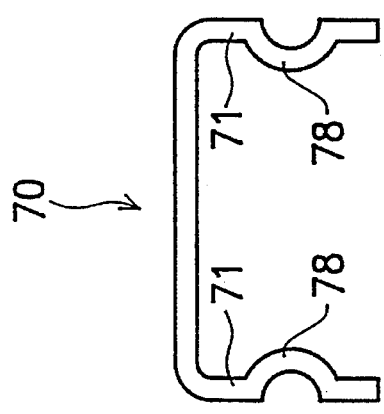
FIGS. 5A–5D show respectively the various embodiments of the grounding strips of the present invention.
Figure 5D:
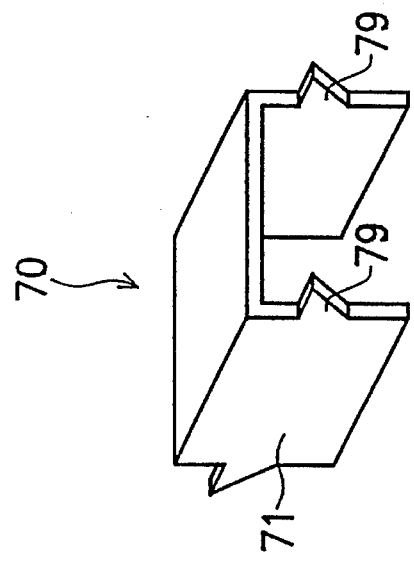
Figure 5A:
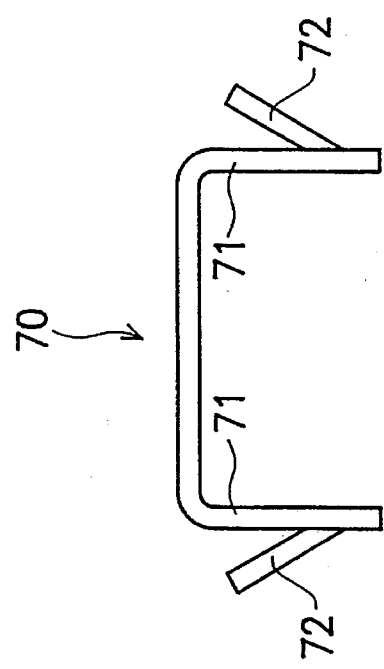
Figure 5B:
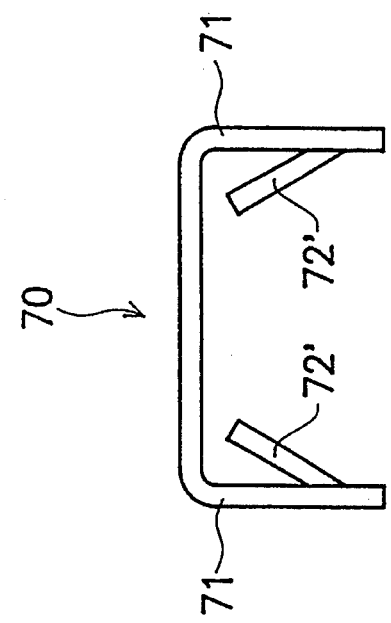

FIGS. 5A–5D show respectively the various embodiments of the grounding strips 70 of the present invention. For example, the resilient plates 72 of FIG. 5A that bend outward, and the resilient plates 72' of FIG. 5B that bend inward, as already described above, serve to secure the grounding strip 70 to the guide frame 80. In a similar manner, the curved portions 78 of the grounding strip 70 of FIG. 5C, as punched out of the surface of the first pair of bent portions 71, serves to latch into the mating configuration inside the corresponding notches not shown in the drawing. FIG. 5D shows another embodiment of the grounding strip 70, wherein one-way stopping protrusions 79 are employed instead of the resilient plates as shown in the drawing.

Figure 6:
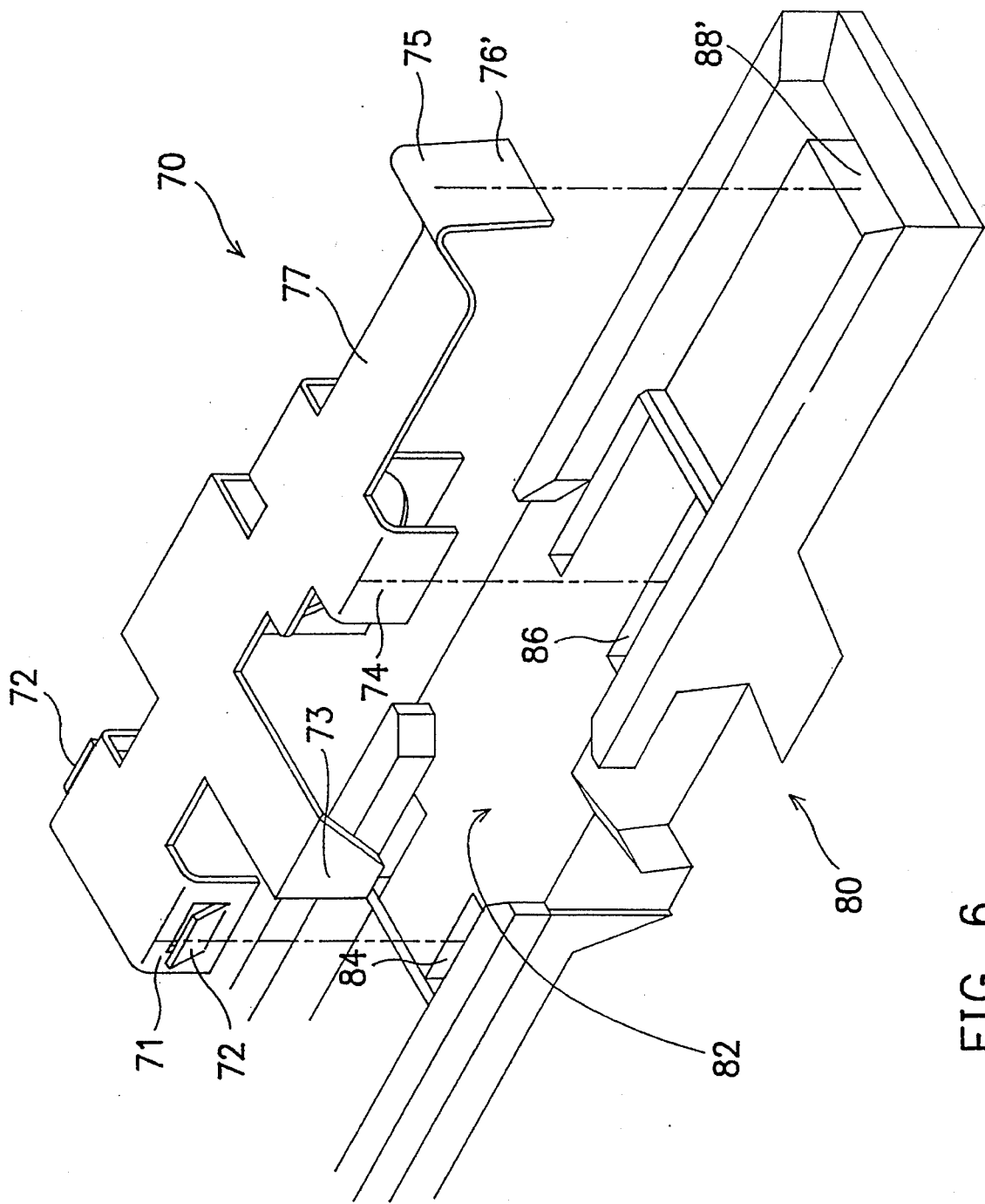
FIG. 6 is an enlarged perspective view of the grounding strip of the memory card connector of FIG. 2 and the corresponding guide frame in accordance with another embodiment of the present invention.

FIG. 6 is an enlarged perspective view of the grounding strip 70 of the memory card connector 1 of FIG. 2 and the corresponding guide frame 82 in accordance with another embodiment of the present invention. This is an embodiment having portions of the structural configuration similar to the embodiment depicted in FIG. 3. The primary difference being that the remote end portion 76' of the elongated body 77 of the grounding strip 70, instead of being extending to the direction leading away from the longitudinal axis of the body 77, is pointing downwardly in the direction perpendicular to the longitudinal axis.

Figure 7:
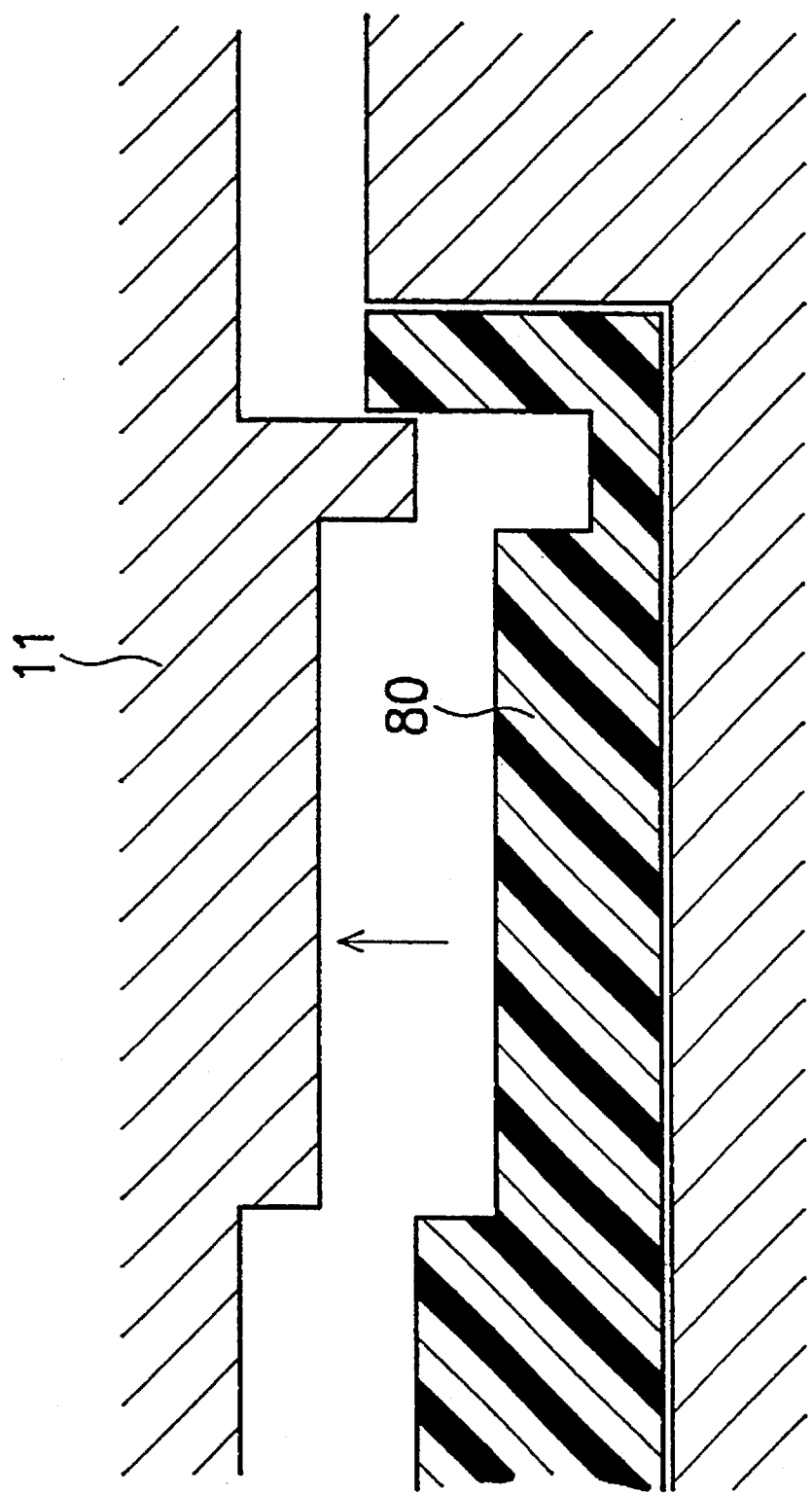
FIG. 7 shows the cross-sectional view of a pair of molds employed for making the guide frame of FIG. 6.
Figure 8:
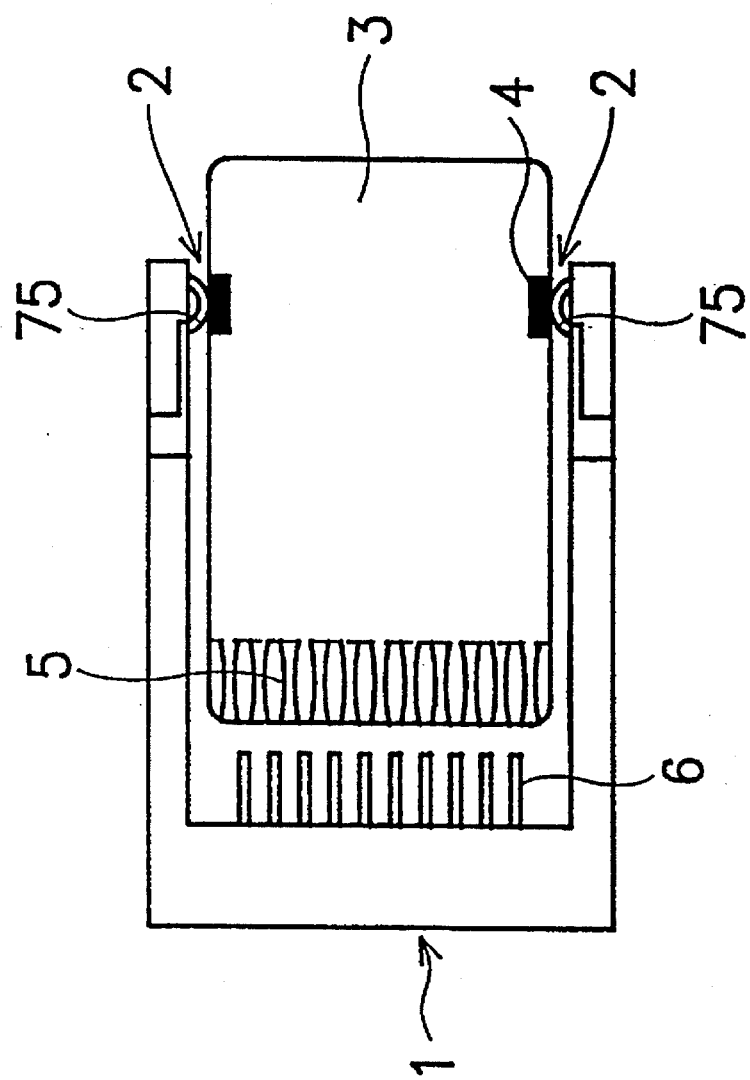
FIG. 8 is a top view of the memory card connector having the grounding strips of FIG. 6 with a memory card inserted therein.

This configuration of the second embodiment of the present invention has at least a few more advantages over the previous embodiment of FIG. 3. First of all, the receiving slot 88' located at the corresponding remote end of the guide frame 80 for receiving the end portion 76' has a slot extending into the direction perpendicular to the axis of the guide frame 80. This permits for easier manufacturing of the guide frame 80 itself. For example, refer to FIG. 7 of the drawing, wherein the cross-sectional view of a pair of molds employed for the making of the guide frame of FIG. 6 is shown. As is seen in the cross-sectional view, in the process of, for example, injection molding for the making of the guide frame 80, one of the two pieces of molds, namely mold 11, can be simple retracted along the direction as shown in the drawing after the plastic injection molding is completed. This simplifies the manufacturing of the guide frame 80.

Secondly, since the end portion 76' is pointing toward the direction perpendicular to the longitudinal axis of the elongated body 77, therefore the contact portion 75 of the grounding strip 70 is allowed to move further forward and close to the opening 2 of the memory card connector 1, as is the situation that can be observed in the top view of the of the memory card connector 1 having the grounding strips 70 of FIG. 6 with a memory card 3 inserted therein. When the memory card 3 is inserted into the memory card connector 1 via the connector opening 2 and pressed into the correct location, where the contact points 5 of the memory card as normally protected inside the female connector would be allowed to mate the contact pins 6 of the memory card connector. The grounding plate 4 of the memory card 3 would then be also in perfect contact with the contact portion 75 of the grounding strip 70 of the memory card connector 1, establishing the ground path for the inserted memory card as it now constitutes a portion of the electronic system of the entire computer system.

As persons skilled in this art may well appreciate, the above description of the embodiments of the present invention is employed for the description of the present invention, not for the restriction to the present invention. Modifications to the outlined embodiments of the present invention may be apparent and should be considered to be within the scope of the present invention that is recited in the claimed section that follows.

What is claimed is:

1. A grounding arrangement for a memory card connector, said memory card connector comprising a guide frame having a pair of guiding slots, each of said guiding slots having formed therein a first pair of horizontally extending notches and a vertically extending receiving slot, said grounding arrangement being fastened to and generally received within only a corresponding one of said guiding slots and comprising:

an elongated body;

a curved contact portion proximate one end of said elongated body that has a portion above a surface of said elongated body;

an end portion integrally extending from said contact portion and positioned at a remote end beyond said contact portion of said elongated body;

a first pair of horizontally extending bent portions respectively located at opposing sides of said elongated body and extending perpendicular to and away from the surface of said elongated body, each of said first bent portions having thereon a latching arrangement;

wherein when said grounding arrangement is assembled to a designated location on said guide frame of said memory card connector, said end portion is received in said receiving slot of said guiding slot, each of said first pair of bent portions is inserted into a corresponding one of said first pair of notches, and said latching arrangement of said first pair of bent portions latch with corresponding configurations inside said corresponding notches.

2. The grounding means for a memory card connector of claim 1, wherein said memory card connector further comprises a second pair of notches formed inside said guide slot, and said grounding means further comprises:

a second pair of bent portions respectively located at opposing sides of said elongated body and extending away from the surface of said elongated body, said second pair of bent portions being located between said first pair of bent portions and said contact portion; and a third pair of bent portions respectively located at opposing sides of said elongated body and extending away from the surface of said elongated body, said third pair of bent portions being located between said second pair of bent portions and said contact portion;

wherein when said grounding means is assembled to a designated location on said guide frame of said memory card connector, each of said third pair of bent portions is inserted into a corresponding one of said second pair of notches, and each of said second pair of bent portions partially covers a surface of said guide frame of said memory card connector.

3. The grounding means for a memory card connector of claim 2, wherein said end portion extends in the direction of the longitudinal axis of said grounding means.

4. The grounding means for a memory card connector of claim 2, wherein said end portion extends in the direction perpendicular to the longitudinal axis of said grounding means.

5. The grounding means of claim 1, wherein each of said latching means is a resilient plate extending out of the surface of said first bent portion that mates with the corresponding configuration inside said notch.

6. The grounding means of claim 1, wherein each of said latching means is a stopping protruded section that mates with the corresponding configuration inside said notch.

7. A memory card connector comprising:

a guide frame having a pair of guiding slots forming a space for receiving a memory card therein, the guide frame having at least a pair of notches horizontally extending within the guide frame and in communication with a corresponding one of the guiding slots;

a grounding arrangement adapted to be attached to and generally positioned within said corresponding one of the guiding slots, said grounding arrangement comprising:

a main body;

a contact portion positioned proximate one end of said main body and projecting into the space;

a pair of bent portions respectively horizontally extending from opposite sides of the main body; and a retention structure formed on each of said pair of bent portions and adapted to be latchably engaged within the corresponding notch of the guide frame such that the grounding arrangement can be securely positioned within the guide slot.

8. The memory card connector as described in claim 7, wherein said guide slot further includes a receiving slot at an end for receiving corresponding end portion of grounding means, and end portion is generally closer to the contact portion than the bent portions.

9. The memory card connector as described in claim 7, wherein said contact portion and said bent portions are substantially positioned adjacent two opposite ends of the main body of the grounding means, respectively.

* * * * *